Patented Oct. 9, 1945

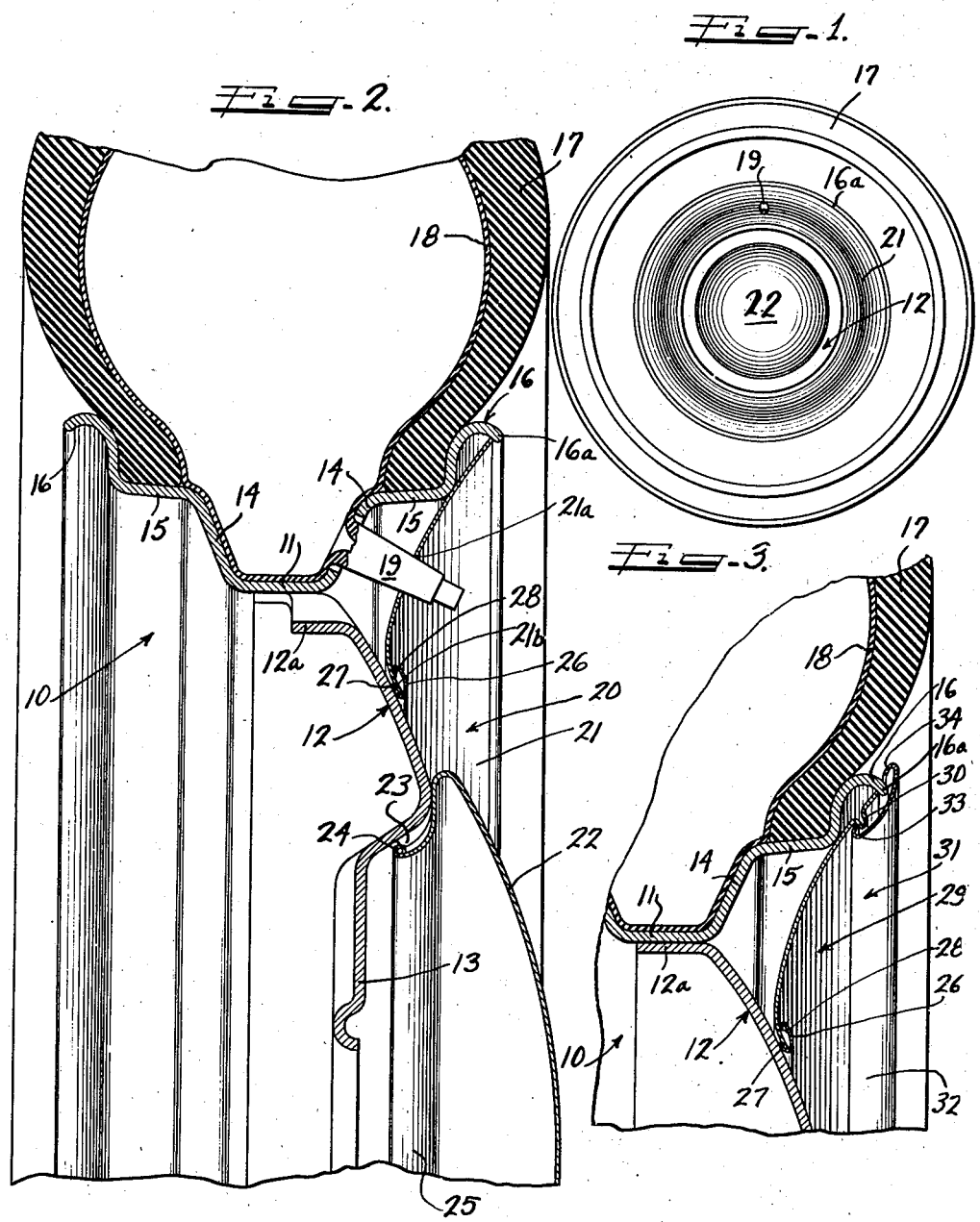

2,386,239

UNITED STATES PATENT OFFICE 2,386,239

WHEEL STRUCTURE

George Albert Lyon, Allenhurst, N. J.

Application July 31, 1943, Serial No. 496,891

4 Claims. (Cl. 301—37)

This invention is directed to an improved wheel structure and relates more particularly to an improved cover assembly therefor.

It is an important object of the invention to provide for a wheel structure and a cover assembly therefor improved retaining means for maintaining the cover over the outer side of the wheel.

Still another object of the invention is to provide for a wheel structure an improved cover assembly which is maintained thereon by virtue of retaining engagement of the radially outer peripheral part thereof with a part of the wheel.

It is still another object of the invention to provide for a wheel structure of the type having a drop center tire rim and a central load bearing portion, a cover assembly including a radially outer annular portion securable to the wheel structure by virtue of engagement of the radially outer marginal part thereof with the adjacent edge portion of the tire rim.

Still another object of the invention is to provide for a wheel structure having a tire rim, an annular cover member for disposition over the outer side of the tire rim, said cover including improved means for maintaining the cover over the tire rim and improved means for reinforcing, rigidifying and ornamenting the peripheral edges thereof.

In accordance with the general features of the invention there is provided herein an annular cover member for disposition over the outer side of a wheel structure and particularly over the outer side of a drop center type tire rim therein, the outer edge of the cover being arranged for retaining engagement with the edge portion of the tire rim and being further provided with annular reinforcing means arranged for attachment to the peripheral edges thereof for rigidifying the cover and further for maintaining the same upon the wheel structure.

It is a further object of the invention to provide for a wheel structure a cover assembly including an outer annular portion which may be constructed from synthetic plastic sheet material or the like and having physical characteristics enabling it to be form retaining and self-sustaining and yet to be temporarily deflectable, said cover having such resilience that when the deflecting pressures are removed therefrom it will assume its original shape and thus not show the distorting effect of accidental abutment against obstacles such as curbing or the like.

Still another object of the invention is to provide for a wheel structure having a tire rim provided with radially inwardly turned edge portions an improved cover assembly including an outer annular part formed from resiliently flexible, retaining, self-supporting material such as sheet synthetic plastic or the like, said cover member being arranged for retention upon the wheel structure by interlocking engagement between the edge portion or the tire rim and the outer peripheral margin thereof and being held in position by virtue of inherent flexing action of the cover which enables the same to be retained upon the wheel structure in flexed condition.

In accordance with the general features of the invention there is provided herein for a wheel structure having a tire rim provided with radially inwardly turned edge portions, a cover assembly including an outer annular portion formed from resiliently flexible, form retaining, self-supporting material such as sheet synthetic plastic or the like, said cover normally describing, at its radially outer part, a circle having greater dimensions than that described by the radially inwardly turned lip of the edge portion of the tire rim, whereby the cover member may be flexed axially inwardly to reduce the size of the circle described by the outer edge thereof, whereby said edge may be snapped into engagement behind the lip of the edge portion so that when released from the insertion pressure it tends to expand and lock itself on the wheel structure, there being provided at the radially inner margin of the cover member a bordering, rigidifying metallic annulus.

In accordance with still another embodiment of the invention there is provided herein an annular cover member of the foregoing character which is provided in the vicinity of the radially outer edge thereof with an axially outward protuberance with which is arranged to be interlocked, an annular bead member having a portion extending radially outwardly beyond the radially outer edge of the cover member and over the edge portion of the tire rim thus to conceal the junction between the tire rim and the cover member and to further enhance the anchorage of the cover member upon the wheel structure.

Other objects and advantages of the invention will become apparent from the following description and accompanying drawing in which:

Figure 1 is a side elevational view of a wheel structure embodying one form of my invention;

Figure 2 is a fragmentary radial cross-sectional view of a wheel structure embodying the form of my invention shown in Figure 1; and Figure 3 is a fragmentary radial cross-sectional view of a wheel structure embodying a modified form of my invention.

It is to be understood that the embodiments shown herein are for illustrative purposes only and may be changed or modified without departing from the spirit and scope of the invention as set forth in the appended claims.

As best shown in Figure 2 the wheel structure with which my present invention is associated includes a tire rim 10 having a base flange 11 to which is secured a central load bearing portion 12 by means of an axially inwardly extending flange 12a of the central load bearing portion, these parts being secured together by welding or riveting or the like.

The central load bearing portion 12 is further provided with a bolt-on flange 13 which may be utilized for securing the assembled wheel structure to a vehicle by means of attachment to a suitable appurtenance thereof such as the brake drum or the like.

The tire rim 10 is further provided with opposite side wall flanges 14, opposite intermediate flanges 15 and opposite edge portions 16 between which may be disposed the radially inner parts of a tire 17 having an inner tube 18 provided with a valve stem 19 which extends through a suitable aperture in the adjacent side wall flange 14.

In the present embodiment, the cover assembly 20 includes a radially outer annular portion 21 and a central circular hub cap simulating portion 22. To the end that the hub cap portion 22 may be securely retained in detachable engagement upon the wheel structure, the central load bearing portion 12 is provided on the outer surface thereof with a plurality of circumferentially spaced protuberances 23 behind which a resilient snap-on bead 24 of a resilient snap-on flange 25 of the cover member 22 is adapted to engage. In applying the cover member 22 to the wheel structure it will be seen that it is merely necessary to urge the same axially inwardly with the bead 24 in alignment with the humps 23 whereupon the movement of the bead over the humps, due to the fact that the normal configuration thereof describes a larger circle than that described by the peaks of the humps 23, causes the bead 24 to be deformed from its normally circular configuration until the peaks of the humps have been passed, whereupon the bead again assumes its circular configuration and is retained securely in the position shown in Figure 2.

The cover member 21 is provided with a suitable aperture 21a through which the valve stem 19 may protrude to be accessible for inflation of the tire. This cover member 21, as will be seen, is annular in configuration and is axially outwardly concave when applied to the wheel structure. When detached from the wheel the annular cover 21 is of such a size that the radially outer edge thereof describes a circle larger than that described by the radially inner surface of the edge portion 16 immediately inwardly of the radially inwardly turned lip portion 16a thereof.

In applying the annular cover member 21 to the wheel structure it is merely necessary for the operator to place the same in concentric relationship against the outer side of the tire rim 10 and then to force the same inwardly, whereupon it will flex into a position substantially shown in Figure 2, whereby the outer circumferential edge thereof will pass axially inwardly beyond the lip 16a of the edge portion 16 so that upon release of the axially inward pressure the cover 21 will tend to flex radially outwardly and thus provide a secure binding engagement between the edge thereof and the axially inner surface of the lip 16a of the tire rim.

Preferably the cover member 21 is formed from thin sheet synthetic plastic material so as to have physical characteristics enabling it to be form retaining and self-supporting and yet readily, temporarily deflectable for the purposes of maintaining it upon the wheel in the manner described above. Furthermore, it has been found that a cover member so constructed greatly reduces the unsprung of the vehicle to which it is attached and lends itself admirably to the ornamentation of the vehicle due to the wide variety of hues and colors in which it may be formed.

When the cover member 21 is disposed in its ultimate position as shown in Figure 2, it will be seen that an intermediate part thereof may, due to the initial radial expanse of the cover, be disposed in abutting relationship with the portion of the outer surface of the tire rim which constitutes the junction between the adjacent intermediate flange 15 and the adjacent edge portion 16. Thus, the intermediate part of the cover member is supported when the cover is inserted within the tire rim.

To the end that the appearance of the cover may be further enhanced and to rigidify and reinforce the radially inner margin thereof, there is provided an annulus 26 preferably formed from stainless steel or any other metal which will take a highly lustrous or enameled finish. The annulus 26 is preferably provided with an intermediate portion that presents an axially outwardly convex surface, the radially inner edge thereof being bent axially inwardly and radially outwardly around the radially inner margin 21b of the cover member 21 as shown at 27. If desired the radially outer edge of the annulus 26 may be turned axially inwardly and radially inwardly back upon the intermediate body thereof as shown at 28 to present to the adjacent portion of the outer surface of the cover member 21 a smooth, non-biting abutment surface.

In the construction shown in Figure 3, the cover member 29 is provided at the radially inner margin thereof with a reinforcing annulus identical to that described in conjunction with the construction of Figure 2. However the cover member 29 differs from the cover member 21 principally in that it is provided with a radially inwardly, axially outwardly, obliquely disposed protuberance 30 adjacent the outer peripheral edge thereof. This protuberance 30 may be in the form of a circular bead as shown or may be in the form of circularly disposed, circumferentially spaced humps.

The protuberance 30 is arranged to receive an annular reinforcing member 31 having an axially outwardly exposed, axially outwardly convexly configurated intermediate portion 32. The annulus 31 is further provided with a radially inner marginal portion turned axially inwardly and radially outwardly back upon itself as at 33 to provide a radially outwardly extending edge arranged to engage axially inwardly of the protuberance 30 and with an axially inwardly, radially inwardly extending outer margin 34. It will be noted that the radial overall expanse of the annulus 31 is of such magnitude that it extends from over the outer marginal portion of the cover member 29 radially outwardly beyond the edge portion 16 of the tire rim, thereby to conceal the junction between the cover member 29 and the wheel structure.

From the foregoing it will be seen that the provision of the annulus 31 serves to completely conceal and ornament the junction between the cover member 29 and the edge portion 16 of the tire rim 10, and furthermore serves to reinforce the radially outer marginal portion of the cover and to protect the same against destruction by abutment with obstacles against which the vehicle is driven.

Preferably the annulus 31 is, like the annulus 26, formed from sheet metal so that it affords considerable rigidity and reinforcement to the associated cover member and furthermore so that a highly lustrous finish may be applied thereto to further augment the appearance of the entire wheel structure when it is applied thereto.

The application of the cover 29, shown in Figure 3, to the wheel structure is similar to that described in conjunction with the structure of Figure 2, in that the cover is disposed in concentric relationship over the outer side of the tire rim and the wheel structure and then urged axially inwardly by pressure which simultaneously flexes the same into an axially outwardly, concave position, whereby the radially outer edge snaps beneath the radially inwardly turned lip portion 16a of the edge portion 16, the cover then being retained on the wheel structure by the inherent tendency of the same to re-expand, thereby being retained on the wheel structure in a flexed condition.

It will be understood that while the cover shown herein as being applied to the edge portion of the tire rim, other shoulders and flanges of the wheel may be utilized for receiving the cover thereto.

What I claim is:

1. In a wheel structure having a tire rim part and a central load bearing part, a cover assembly including a radially outer annular part formed from synthetic plastic material and having physical characteristics enabling it to be self-supporting and form retaining and yet resiliently flexible, said annular member having a radially outer circular edge arranged to be secured to a flange of a wheel part by application of pressure axially inwardly against the wheel whereby the cover is urged into axially outwardly, concave cross-sectional configuration with the radially outer edge thereof being drawn axially inwardly of a flange of the wheel part, said cover being disposed over the outer side of the wheel structure and being retained thereon under a condition of stress by the pressure engagement of the radially outer edge portion thereof against a shoulder of said wheel part after the axial inward pressure has been removed therefrom, said annular cover part being provided at the radially outer portion thereof with a metallic reinforcing annulus secured thereto and having a radial expanse of such magnitude that it extends radially outwardly beyond the junction between the radially outer edge of the cover and the wheel part thereby to conceal the same.

2. In a wheel structure including a tire rim of the drop center type having a radially inwardly, axially outwardly formed edge portion and a central load bearing portion, a cover assembly including an annular cover member formed by synthetic plastic material and having physical characteristics enabling it to be self-supporting and form retaining and yet resiliently flexible, said cover member having a radially outer edge normally describing a circle greater than that described by the terminals of said edge portion of the tire rim and being arranged to be urged axially inwardly of the tire rim and flexed into an axially outwardly, concave configuration whereby the edge portion is drawn inwardly to snap axially inwardly of the terminal part of the edge portion of the tire rim so that said edge is urged radially outwardly by the inherent flexibility of the cover member into retaining engagement with the edge portion of the tire rim and an annular member for concealing the junction between the tire rim and said annular cover member, said annular member having a portion retainingly engaged with the annular cover member and a portion extending radially outwardly over the junction between the annular cover member and the tire rim.

3. In a cover assembly for disposition over the outer side of a wheel structure having a tire rim provided with a radially inwardly extending lip on the edge portion thereof, a circular cover formed from resilient sheet synthetic plastic material and having a radially outer edge arranged to be press-fitted behind said lip to retain the cover on the wheel under a condition of stress, and an ornamental bead for said cover, said bead having a radial inner portion engageable with the cover and a radial outer part extending radially outwardly beyond the edge of the cover and the edge portion of the rim to conceal the junction of the cover with the rim and to afford reinforcement and protection for the edge of the cover.

4. In a cover assembly for disposition over the outer side of a wheel structure having a tire rim provided with a radially inwardly extending lip on the edge portion thereof, a circular cover formed from resilient sheet synthetic plastic material and having a radially outer edge arranged to be press-fitted behind said lip to retain the cover on the wheel under a condition of stress, and an ornamental bead for said cover, said cover having attaching means at the radially outer part thereof and said bead having at the radially inner part thereof an underturned portion for retainingly engaging the attachment means on the cover, said bead also including a radially outer part disposed radially outwardly beyond the edge portion of the tire rim.

GEORGE ALBERT LYON.